(12) United States Patent  
Pendergrass

(10) Patent No.: US 7,771,302 B2
(45) Date of Patent: Aug. 10, 2010

(54) APPARATUS FOR INDICATING POWER TRANSMISSION BELT DYNAMICS

(75) Inventor: Jeffrey A. Pendergrass, Willard, MO (US)

(73) Assignee: Dayco Products, LLC, Tulsa, OK (US)

( * ) Notice: Subject to any disclaimer, the term of this patent is extended or adjusted under 35 U.S.C. 154(b) by 1107 days.

(21) Appl. No.: 11/110,672

(22) Filed: Apr. 21, 2005

(65) Prior Publication Data
US 2006/0240922 A1    Oct. 26, 2006

(51) Int. Cl.
*F16H 7/08* (2006.01)
(52) U.S. Cl. ..................................... 474/109
(58) Field of Classification Search ............... 474/101, 474/108, 109, 113, 119, 133, 135
See application file for complete search history.

(56) References Cited

U.S. PATENT DOCUMENTS

| | | | | |
|---|---|---|---|---|
| 2,337,591 A | * | 12/1943 | Coulson | 474/112 |
| 2,575,313 A | * | 11/1951 | Covert et al. | 474/110 |
| 4,464,146 A | * | 8/1984 | Arthur | 474/133 |
| 4,478,595 A | | 10/1984 | Hayakawa et al. | |
| 4,917,655 A | * | 4/1990 | Martin | 474/112 |
| 5,439,420 A | * | 8/1995 | Meckstroth et al. | 474/133 |

(Continued)

FOREIGN PATENT DOCUMENTS

| | | |
|---|---|---|
| DE | 10155199 | 5/2003 |
| EP | 1158287 A2 * | 11/2001 |
| EP | 1444452 | 5/2003 |
| WO | WO2004109247 A2 | 12/2004 |

OTHER PUBLICATIONS

European Search Report, European Application No. 06750210.4, 6 pages (Mar. 10, 2009).

(Continued)

*Primary Examiner*—Vicky A Johnson
(74) *Attorney, Agent, or Firm*—Thompson Hine LLP

(57) ABSTRACT

An apparatus for indicating an automotive power transmission belt dynamic is provided. The apparatus includes a belt tensioner including a support housing and an arm rotatably connected to the support housing. A pulley is carried by the arm, the pulley having a belt-engaging surface. A spring is connected to the arm and support housing to bias the arm to pivot relative to the support housing. A sensor is responsive to an input associated with a position of the arm relative to the sensor, the sensor providing an indication in response to receipt of the input. A signaling device is configured to provide a signal to a user in response to the indication provided by the sensor.

21 Claims, 6 Drawing Sheets

U.S. PATENT DOCUMENTS

| | | | |
|---|---|---|---|
| 5,558,370 | A | 9/1996 | Behr |
| 6,206,797 | B1 * | 3/2001 | Quintus ...................... 474/135 |
| 6,422,962 | B1 * | 7/2002 | Lehtovaara et al. ......... 474/101 |
| 6,478,118 | B2 | 11/2002 | Astrom et al. |
| 6,554,318 | B2 | 4/2003 | Kohut et al. |
| 6,609,985 | B2 | 8/2003 | Todd et al. |
| 6,834,631 | B1 | 12/2004 | Blackburn et al. |
| 6,849,011 | B2 * | 2/2005 | Calfa et al. ................. 474/102 |
| 7,217,207 | B1 * | 5/2007 | Hallen ........................ 474/135 |
| 2003/0153421 | A1 | 8/2003 | Liu |

OTHER PUBLICATIONS

PCT, International Search Report, International Application No. PCT/US2006/014117, 2 pages (mailed Sep. 26, 2007, published Dec. 27, 2007).

PCT, Written Opinion of the International Searching Authority, International Application No. PCT/US2006/014117, 3 pages (mailed Sep. 26, 2007).

PCT, International Preliminary Report on Patentability, International Application No. PCT/US2006/014117, 4 pages (Sep. 4, 2008).

* cited by examiner

APPARATUS FOR INDICATING POWER TRANSMISSION BELT DYNAMICS

TECHNICAL FIELD

The present application relates generally to belt tensioners and more particularly to a belt tensioner including a sensor for use in indicating power transmission belt dynamics.

BACKGROUND

A tensioner is frequently utilized in a belt system to tension an endless belt that transmits power to accessories in an automobile engine. Tensioners may use a spring, such as a flat wire or round wire spring to bias a pivot arm toward the belt. Often times, after a period of use, the belts tend to wear and need to be replaced. Frequently, belt wear is detected by visual inspection. In some cases, belts are replaced using only recommended guidelines such as belt replacement every 15,000 miles of vehicle travel or yearly belt replacement.

SUMMARY

In an aspect, an apparatus for indicating an automotive power transmission belt dynamic is provided. The apparatus includes a belt tensioner including a support housing and an arm rotatably connected to the support housing. A pulley is carried by the arm, the pulley having a belt-engaging surface. A spring is connected to the arm and support housing to bias the arm to pivot relative to the support housing. A sensor is responsive to an input associated with a position of the arm relative to the sensor, the sensor providing an indication in response to receipt of the input. A signaling device is configured to provide a signal to a user in response to the indication provided by the sensor.

In another aspect, a method of indicating tension applied to an automotive power transmission belt is provided. The method includes tensioning an automotive belt using a belt tensioner that includes a support housing mounted to an engine. A pivot arm is rotatably connected to the support housing and has a pulley having a belt-engaging surface carried by the pivot arm, the pivot arm being biased to pivot relative to the support housing. A position of the pivot arm is indicated using a sensor, where with the pivot arm at a predetermined position, a user is signaled.

The details of one or more embodiments are set forth in the accompanying drawings and the description below. Other features, objects, and advantages will be apparent from the description and drawings, and from the claims.

DETAILED DESCRIPTION

Figure 1:
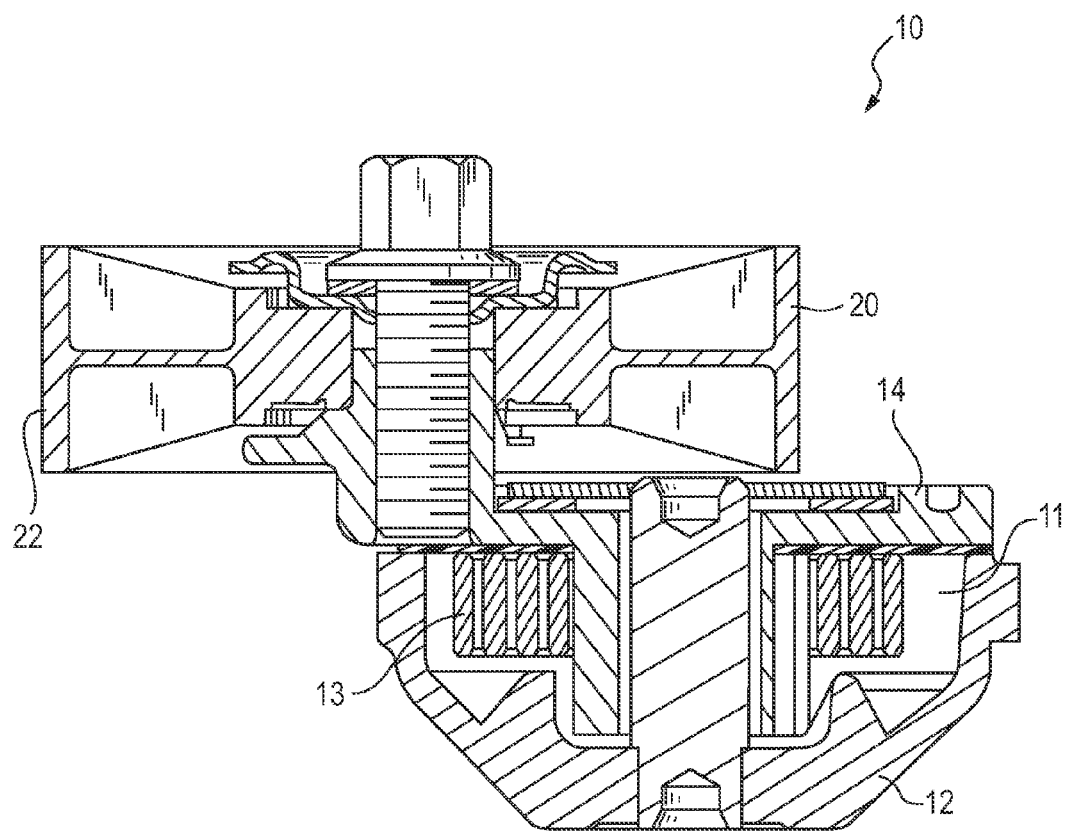
FIG. 1 is a section view of an embodiment of a belt tensioner.

Referring to FIG. 1, a belt tensioner 10 includes a support housing 12 and a pivot arm 14 rotatably mounted to the support housing to form a spring cavity 11 therebetween. Located within the spring cavity 11 and operatively connected to both the pivot arm 14 and the support housing 12 is a spring 13, such as a round wire or flat wire spring. The spring 13 applies a force to the pivot arm 14 during use to bias the pivot arm toward an unloaded position. The pivot arm 14 carries a pulley 20, such as a front or backside idler pulley, that can rotate relative to the pivot arm. The pulley 20 has a belt-engaging surface 22 for engaging a belt 116, such as an automotive transmission belt (FIG. 2).

Figure 2:
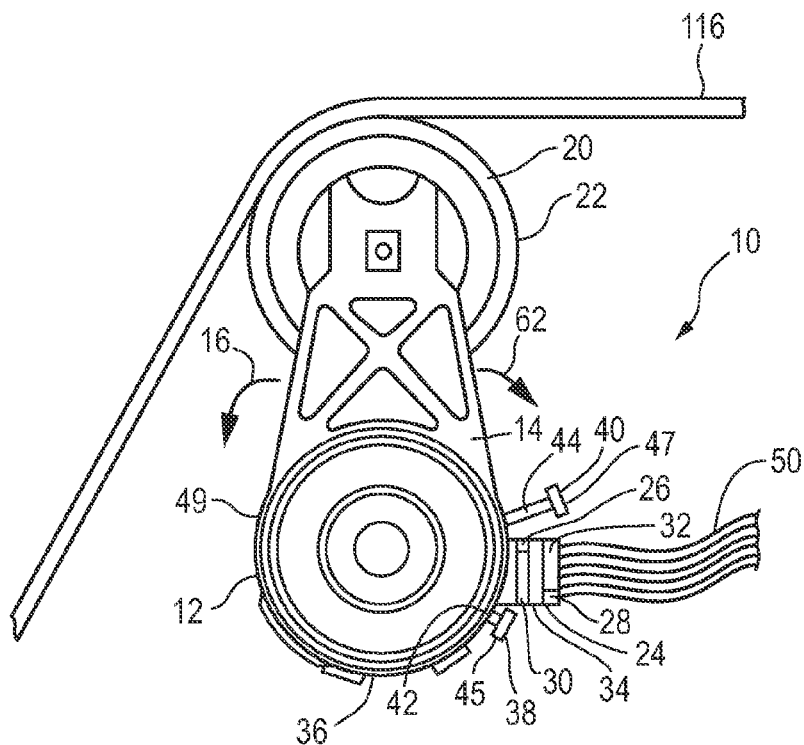
FIG. 2 is a top view of an embodiment of a belt tensioner engaging a belt.
Figure 3:
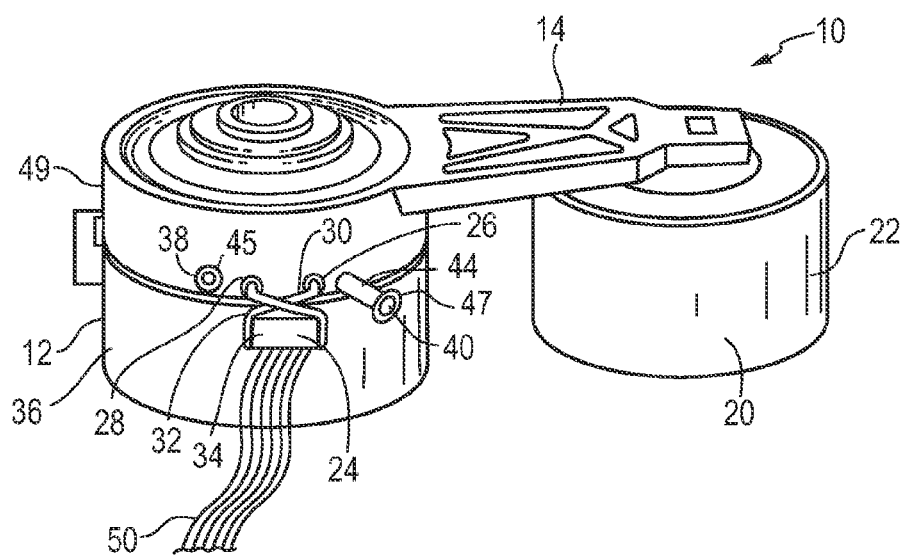
FIG. 3 is a perspective view of the belt tensioner of FIG. 2.

Referring to FIGS. 2 and 3, the belt tensioner 10 includes a sensor 24 (e.g., a limit switch) that is responsive to an input associated with a position of the pivot arm 14. Upon receipt of the input, the sensor 24 provides an indication. In some embodiments, the sensor 24, by responding to input associated with position of the pivot arm 14, can provide detection of excessive belt 116 dynamics, which can be an indication of, for example, excessive belt stretch, incorrect belt sizing, etc. Such belt problems may be a result of or lead to other vehicle problems, such as misfire, failing or locked accessory components, broken belts, fuel feed problems during vehicle accelerations and/or engine start ups, etc. In some embodiments, sensor 24 may provide an indication of desirable belt conditions, e.g., to indicate operation of the belt 116 at extremes of any desirable range of belt tensions.

Figure 6:
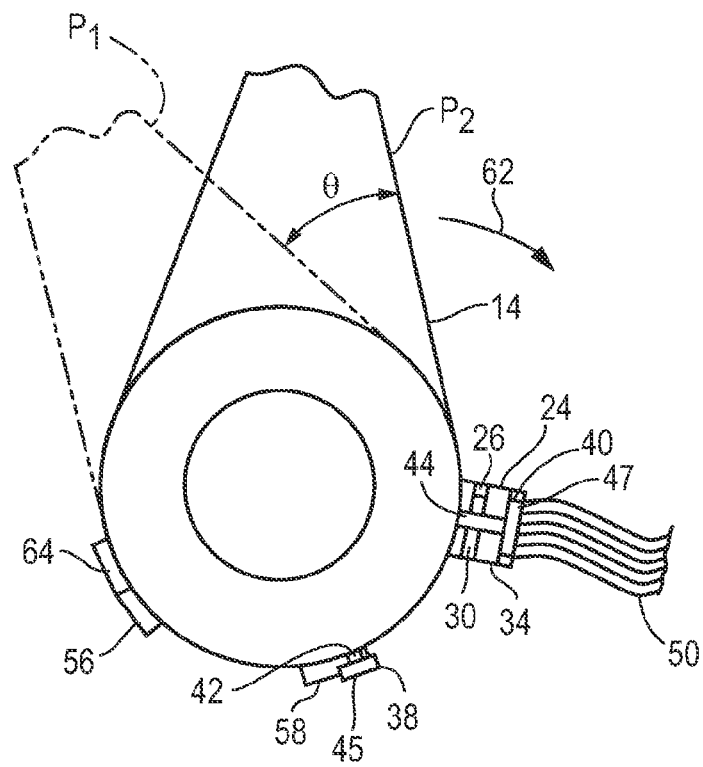
FIG. 6 is a diagrammatic top view of the belt tensioner of FIG. 2 with the pivot arm in a second limit position.
Figure 7:
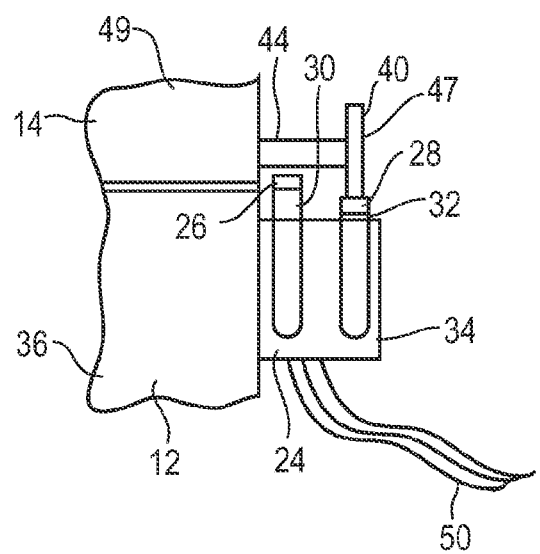
FIG. 7 is a detail, diagrammatic side view of the belt tensioner of FIG. 6.
Figure 8:
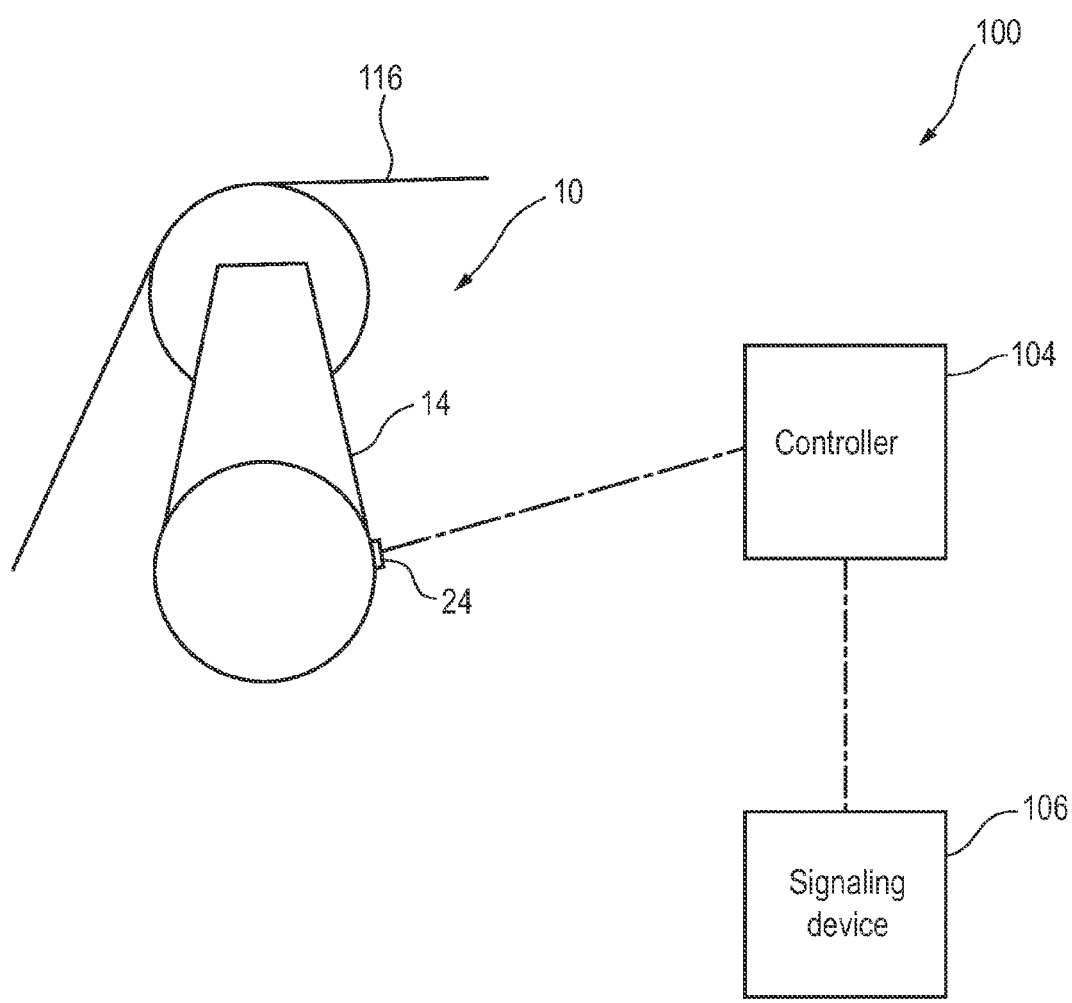
FIG. 8 is a diagrammatic illustration of a warning system for detecting pivot arm position and belt tension. In the drawings, like reference numbers indicate identical or functionally similar elements.

Referring also to FIGS. 4-7, sensor 24 is a switch that includes a first toggle cam 26, a second toggle cam 28 and conductors 50 for electrically connecting the switch to, for example, a controller (see FIG. 8). First toggle cam 26 and second toggle cam 28 are each positioned at a distal end of a respective flexible, elastic finger 30 and 32. The fingers 30 and 32 are supported in a cantilevered relationship by a switch body 34 that is mounted to an outer surface 36 of the support housing 12.

As can be seen best by FIGS. 2 and 4-7, second toggle cam 28 is positioned a greater distance from the support housing 12 than first toggle cam 26. This can allow for, in the illustrated embodiment, actuation of the switch at two, angularly spaced apart limit positions $P_1$ and $P_2$ (see FIGS. 4 and 6, respectively) of the pivot arm 14 relative to the support housing 12 using appropriately sized and positioned actuation members 38 and 40. Actuation member 38 is shorter than actuator member 40 and each actuation member includes a narrow stem portion 42, 44 that extends integrally from an outer surface 49 of the pivot arm 14 to an enlarged distal end 45 and 47. Distal end 45 of actuation member 38 is sized to contact the first toggle cam 26 and distal end 47 of actuation member 40 is sized to contact the second toggle cam 28, without either of the actuation members 38, 40 making contact with the other of the toggle cams.

Figure 5:
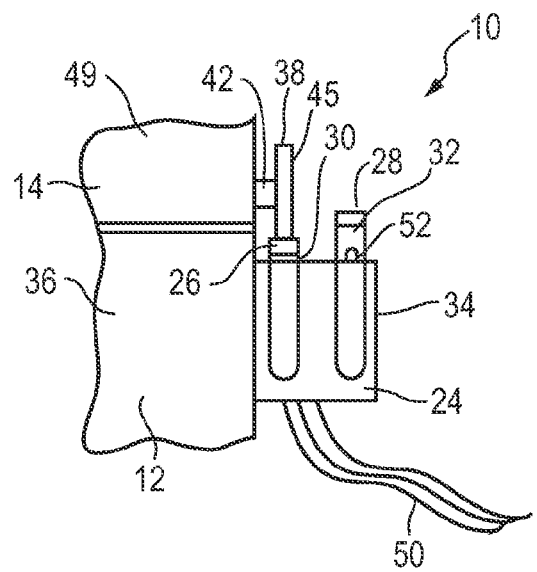
FIG. 5 is a detail, diagrammatic side view of the belt tensioner of FIG. 3.

With the pivot arm 14 at limit positions $P_1$ and $P_2$ relative to the support housing 12, the enlarged distal ends 45 and 47 contact the first and second toggle cams 26 and 28, respectively. This contact can deflect the associated fingers 30, 32, which, in turn, can depress a respective switch member 52 (see FIG. 5 showing only one of the switch members 52). The switch 25 and actuation members 38 and 40 may be connected to the belt tensioner 10 by any suitable method including by mechanical fasteners and/or by welding.

Figure 4:
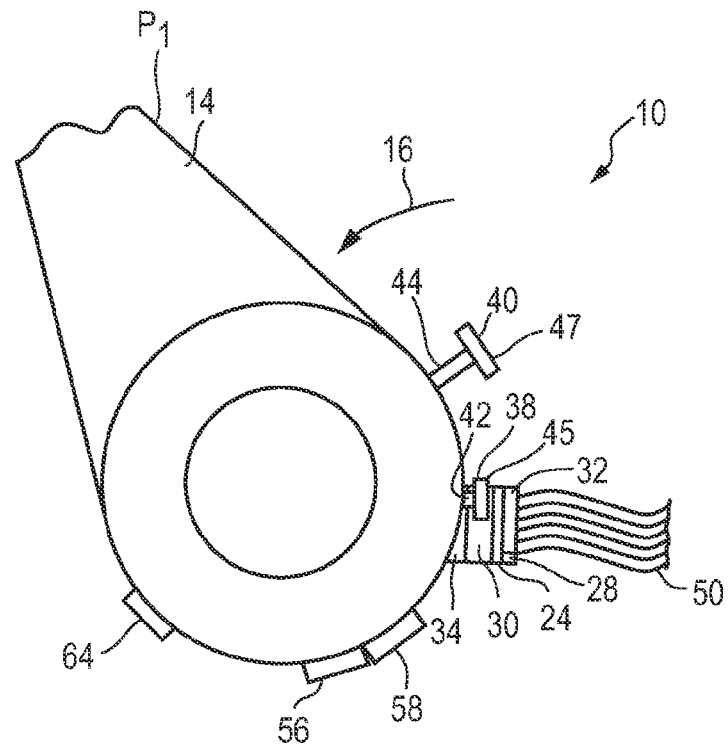
FIG. 4 is a diagrammatic top view of the belt tensioner of FIG. 2 with the pivot arm in a first limit position.

Referring to FIGS. 4 and 5, pivot arm 14 is shown at $P_1$ with cooperating stops 56 and 58 inhibiting further rotation of the pivot arm relative to the support housing 12 in the direction of arrow 16. With pivot arm 14 at $P_1$, actuation member 38 is in contact with first toggle cam 26 (FIG. 5), deflecting finger 30, e.g., to close the switch. Pivot arm 14 in this position may indicate, for example, a broken belt, use of a belt of improper length (e.g., too long), belt slippage, belt jumping, improper belt positioning, etc.

Referring back to FIG. 2, upon mounting the belt tensioner 10 in a vehicle and assembling the belt 116, the belt applies a force to the pivot arm 14 causing the pivot arm to rotate in a direction opposite bias direction 16, i.e., in the direction of arrow 62. Rotation of the pivot arm 14 in the direction of arrow 62 causes the actuation member 38 to disengage the first toggle cam 26, which allows finger 30 to recover at least substantially to its initial position (see FIG. 3). During normal operation, the pivot arm 14 is located between $P_1$ and $P_2$ as shown in FIGS. 2 and 3. In some embodiments, during normal operation the switch is open. Spring biasing of the pivot arm and tensioning an automotive transmission belt is described in detail in U.S. Pat. No. 6,206,797, the details of which are incorporated by reference as if fully set forth herein.

Referring now to FIGS. 6 and 7, pivot arm 14 is shown at $P_2$ with pivot arm 14 rotated an angle θ from $P_1$. The range of θ depends on the desired use of tensioner 10. Cooperating stops 56 and 64 inhibit further rotation of the pivot arm beyond θ relative to the support housing 12 in the direction of arrow 62. With the pivot arm 14 at $P_2$, actuation member 40 contacts the second toggle cam 28 (FIG. 7) and deflects finger 32 which, e.g., closes the switch to provide a positive indication. Pivot arm 14 in this position may indicate for example, the presence of high transient torsional loadings or tension reversal in the drive due to torsional events at the crankshaft or at an accessory pulley, engine misfire, failing or locked components, fuel feed problems, use of a belt of improper length (e.g., too short), excessive hub loads, etc. Additionally, as noted above, $P_1$ and $P_2$ may be located at other positions (e.g., other than the stop positions illustrated by FIGS. 4-7) to indicate operation of the belt 116 at the extremes of a desired range of belt tensions, the signal from which might be used to control, for example, the engagement of a fan clutch, air conditioner and/or throttle control.

Referring now to FIG. 8, a system 100 for use in alerting a user (e.g., the driver of an automobile) of excessive travel of pivot arm 14 includes the belt tensioner 10 with the sensor 24. Belt tensioner 10 is mounted to an engine (not shown) for use in tensioning belt 116. Sensor 24 is connected to a controller 104 capable of receiving indication from the sensor. Controller 104, in response to receipt of indication from the sensor 24, controls a signaling device 106 (e.g., a light, a buzzer, a display, such as a monitor or LCD etc.) for signaling the user. For example, the controller 104 may be configured to recognize opening (and/or closing) of an electrical circuit, such as in the embodiment described above with respect to FIGS. 1-6 where sensor 24 is in the form of a switch. In some embodiments, the sensor 24 can be connected directly to the signaling device 106. By providing a signal to a user, early detection of engine problems such as loss of voltage, loss of water, engine overheating and engine failure can be realized. Additionally, the system 100 may provide a warning to a user, e.g., prior to complete belt failure that is not dependent on, for example, visual inspection or recommended guidelines.

Figure 9:
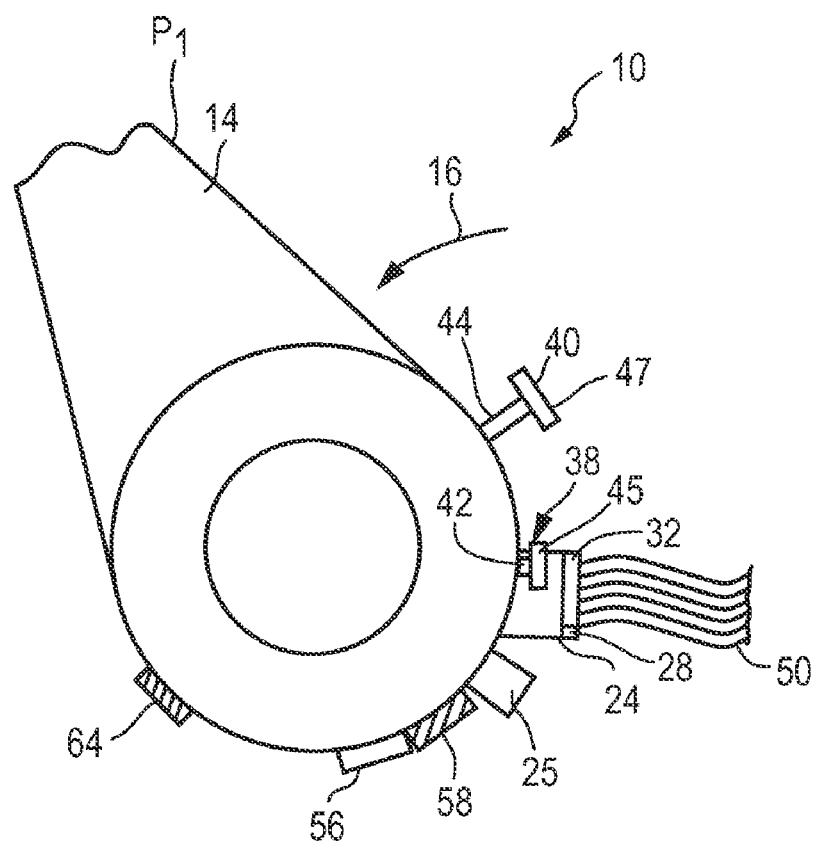

A number of detailed embodiments have been described. Nevertheless, it will be understood that various modifications may be made. For example, while a switch with multiple toggle cams has been primarily described above, other sensors can be used, such as multiple switches 24, 25 (FIG. 9) or one switch (FIGS. 4-7) with one or more toggle cams, Hall effect sensors, laser position sensors, potentiometers, or quantized devices such as trigger wheels with inductive pick-ups and proximity switches. Additionally, the sensor 24 can be used to activate features such as magneto-rheological (MR) and electro-rheological (ER) devices, valves and servos, and/or to provide feedback to the belt tensioner for self adjustment, for example, using an electro-mechanical device capable of adjusting pivot arm tension and/or position. For example, based on receipt of indication from sensor 24, a controller may control the adjustment of the pivot arm tension and/or position by signaling an electro-mechanical device connected to the pivot arm. In some embodiments, the sensor may not be mounted to the support housing and may instead be mounted directly to, for example, a stationary component of the engine, such as the engine block. In some embodiments, the sensor may provide relative (e.g., relative to the support housing or engine block) or absolute position of the pivot arm 14. Accordingly, other embodiments are within the scope of the following claims.

What is claimed is:

1. An apparatus for indicating an automotive power transmission belt dynamic, the apparatus comprising:
    a belt tensioner including
        a support housing defining a pivot axis;
        an arm rotatably connected to the support housing and rotatable about a pivot axis;
        a pulley carried by the arm, the pulley having a belt-engaging surface;
        a spring connected to the arm and support housing to bias the arm to pivot relative to the support housing;
        a sensor assembly responsive to an input associated with an angular position of the arm relative to the sensor assembly, the sensor assembly providing an indication in response to receipt of the input; and
    a signaling device configured to provide a signal to a user in response to the indication provided by the sensor;
    wherein the sensor assembly comprises:
        a first actuation member positioned on the outer surface of the arm that is concentric about the pivot axis at a first position that represents a first angular position of the arm relative to the support housing;
        a second actuation member positioned on the outer surface of the arm that is concentric about the pivot axis at a second position that represents a second angular position of the arm relative to the support housing; and
        at least one sensor triggerable by the first actuation member, the second actuation member, or a combination thereof.

2. The apparatus of claim 1, wherein the sensor receives input when the arm is at the first or the second angular positions.

3. The apparatus of claim 1, wherein the sensor provides indication in response to the first angular position of the pivot arm and the second angular position of the pivot arm.

4. The apparatus of claim 1, wherein the sensor comprises a limit switch.

5. The apparatus of claim 4, wherein the limit switch is open with the arm positioned within a predetermined angular range relative to the support housing, the limit switch closing to provide the indication when the arm is in the first angular position or the second angular position.

6. The apparatus of claim 1 further comprising a controller connected to the sensor.

7. The apparatus of claim 6, wherein the signaling device is connected to the controller.

8. The apparatus of claim 7, wherein the controller activates the signaling devices in response to receipt of the indication.

9. The apparatus of claim 1, wherein the signaling device is connected to the sensor.

10. The apparatus of claim 1, wherein the sensor is mounted to the support housing.

11. The apparatus of claim 1, wherein the at least one sensor is a first sensor triggerable by the first actuation member, and the apparatus further comprises a second sensor triggerable by the second actuation member.

12. A method of indicating tension applied to an automotive power transmission belt, the method comprising:

tensioning an automotive belt using a belt tensioner that includes a support housing mounted to an engine, a pivot arm rotatably connected to the support housing to rotate about a pivot axis and a pulley having a belt-engaging surface carried by the pivot arm, the pivot arm being biased to pivot relative to the support housing;

indicating a position of the pivot arm using a sensor assembly; and signaling a user using the sensor assembly when the pivot arm is rotated to a predetermined position, wherein the sensor assembly comprises:

a first actuation member positioned on the outer surface of the arm that is concentric about the pivot axis at a first position that represents a first angular position of the arm relative to the support housing;

a second actuation member positioned on the outer surface of the arm that is concentric about the pivot axis at a second position that represents a second angular position of the arm relative to the support housing; and at least one sensor triggerable by the first actuation member, the second actuation member, or a combination thereof.

13. The method of claim 12 comprising indicating multiple positions of the pivot arm relative to the support housing using the sensor.

14. The method of claim 12 further comprising connecting the sensor to a controller, the controller configured to respond to indication from the sensor.

15. The method of claim 14 further comprising connecting the controller to a signaling device, the signaling device signaling the user.

16. The method of claim 15, wherein the step of signaling the user includes activating the signaling device using the controller.

17. The method of claim 12, wherein the sensor responds to input associated with the position of the pivot arm relative to the housing.

18. The method of claim 12, wherein the sensor comprises a switch.

19. The method of claim 18, wherein the switch closes with the pivot arm at the first angular position or the second angular position.

20. The method of claim 12, wherein the step of indicating a position of the pivot arm includes indicating the position of the pivot arm relative to the sensor, the sensor mounted to the support housing.

21. The method of claim 12, wherein the at least one sensor is a first sensor triggerable by the first actuation member, and the apparatus further comprises a second sensor triggerable by the second actuation member.

* * * * *